(12) United States Patent
Murakami

(10) Patent No.: US 10,690,115 B2
(45) Date of Patent: Jun. 23, 2020

(54) SLIDING COMPONENT AND WEAR DETECTION SYSTEM USING THE SAME

(71) Applicant: MINEBEA MITSUMI INC., Kitasaku-gun, Nagano (JP)

(72) Inventor: Tatsuhiko Murakami, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 829 days.

(21) Appl. No.: 15/239,543

(22) Filed: Aug. 17, 2016

(65) Prior Publication Data

US 2017/0051721 A1 Feb. 23, 2017

(30) Foreign Application Priority Data

Aug. 21, 2015 (JP) ................. 2015-163623

(51) Int. Cl.
| | | |
|---|---|---|
| F03D 7/02 | (2006.01) | |
| F16C 33/26 | (2006.01) | |
| F16C 17/24 | (2006.01) | |
| F16C 17/04 | (2006.01) | |
| F03D 13/20 | (2016.01) | |
| F03D 17/00 | (2016.01) | |
| F03D 80/70 | (2016.01) | |
| F16C 41/00 | (2006.01) | |
| G01M 13/04 | (2019.01) | |
| F16C 33/20 | (2006.01) | |

(52) U.S. Cl.
CPC ........... *F03D 7/0204* (2013.01); *F03D 13/20* (2016.05); *F03D 17/00* (2016.05); *F03D 80/70* (2016.05); *F16C 17/04* (2013.01); *F16C 17/246* (2013.01); *F16C 33/26* (2013.01); *F16C 33/201* (2013.01); *F16C 41/001* (2013.01); *F16C 2202/32* (2013.01); *F16C 2300/14* (2013.01); *F16C 2360/31* (2013.01); *G01M 13/04* (2013.01); *Y02E 10/722* (2013.01); *Y02E 10/726* (2013.01)

(58) Field of Classification Search
CPC ........ F03D 7/0204; F03D 17/00; F03D 13/20; F03D 80/70; F16C 17/246; Y02E 10/726
USPC .................................. 73/146; 340/657, 679
See application file for complete search history.

(56) References Cited

U.S. PATENT DOCUMENTS 5,701,119 A 12/1997 Jurras, III
6,180,574 B1 1/2001 Ryan et al.
(Continued)

FOREIGN PATENT DOCUMENTS

JP 56-18119 2/1981
JP 2007-255712 A 10/2007
(Continued)

OTHER PUBLICATIONS

Jan. 30, 2017 Extended Search Report issued in European Patent Application No. 16184935.1.
(Continued)

*Primary Examiner* — Richard A Edgar
*Assistant Examiner* — Maxime M Adjagbe
(74) *Attorney, Agent, or Firm* — Pearne & Gordon LLP

(57) ABSTRACT

There is provided a sliding component including, a first sliding part which is non-conductive and which has a sliding surface; and a conductive member provided in the first sliding part or provided on a side opposite to the sliding surface of the first sliding part.

21 Claims, 8 Drawing Sheets

(56) References Cited

U.S. PATENT DOCUMENTS

| | | | |
|---|---|---|---|
| 7,270,890 B2* | 9/2007 | Sabol | C23C 4/18 |
| | | | 416/61 |
| 8,564,449 B2* | 10/2013 | Mitchell | F04C 14/00 |
| | | | 340/454 |
| 2005/0158511 A1 | 7/2005 | Sabol et al. | |
| 2007/0223850 A1 | 9/2007 | Lopes et al. | |
| 2009/0223083 A1 | 9/2009 | LeCrone | |
| 2009/0252448 A1* | 10/2009 | Ozu | F16C 19/26 |
| | | | 384/551 |
| 2011/0031755 A1 | 2/2011 | Numajiri | |
| 2011/0169651 A1 | 7/2011 | Mitchell et al. | |
| 2011/0233939 A1* | 9/2011 | Noda | F16C 17/04 |
| | | | 290/55 |
| 2011/0262059 A1 | 10/2011 | Karaki et al. | |
| 2014/0169713 A1 | 6/2014 | Karaki et al. | |

FOREIGN PATENT DOCUMENTS

| | | |
|---|---|---|
| JP | 2011-247408 A | 12/2011 |
| JP | 2012-149736 A | 8/2012 |
| JP | 2013-528781 A | 7/2013 |
| WO | 2009/150716 A1 | 12/2009 |

OTHER PUBLICATIONS

Notice of Reasons for Rejection dated Jul. 4, 2017 for corresponding Japanese Application No. 2015-163623 and partial English translation.

* cited by examiner

SLIDING COMPONENT AND WEAR DETECTION SYSTEM USING THE SAME

CROSS REFERENCE TO RELATED APPLICATION

The present application claims priority from Japanese Patent Application No. 2015-163623 filed on Aug. 21, 2015, and titled "SLIDING COMPONENT AND WEAR DETECTION SYSTEM USING THE SAME", the disclosure of which is incorporated herein by reference in its entirety.

BACKGROUND

The present disclosure relates to a sliding component configured to detect the occurrence of wear by using a conductive member disposed below a sliding surface, and a wear detection system using the same.

In wind power generators, blades are required to always face in a windward direction during power generation in order to convert wind power into electric power efficiently. Thus, wind power generators typically include a nacelle which rotatably supports blades around a horizontal axis and a yaw system (yaw damper). The yaw system rotates the nacelle relative to a tower (a prop or strut) around a vertical axis based on, for example, detection of a direction of wind, thereby turning blades in the windward direction.

International Publication No. 2009/150716 discloses an exemplary yaw system. In the yaw system disclosed in International Publication No. 2009/150716, a nacelle slides on sliding pads disposed in a tower using power from an electric motor, and rotates on the tower around a vertical axis.

SUMMARY

Allowing the nacelle to slide on the sliding pads wears away the sliding pads. Thus, the wear state of the sliding pads is required to be inspected periodically. The sliding pads, however, are disposed on the tower, that is, disposed at a high location, and thus an inspection of the wear state is not easy, involving a great deal of labor and high risk.

The present disclosure has been made to solve the above problem. An object of the present disclosure is to provide a sliding component which allows to easily recognize the wear state. Such a sliding member can be for example a sliding pad. Another object of the present disclosure is to provide a wear detection system configured to easily detect the wear state of the sliding member.

According to a first aspect of the present disclosure, there is provided a sliding component including: a first sliding part which is non-conductive and which has a sliding surface; and a conductive member provided in the first sliding part or provided on a side opposite to the sliding surface of the first sliding part.

EMBODIMENTS

First Embodiment

An explanation will be made about the first embodiment of the present disclosure with reference to FIGS. 1 to 3.

At first, an explanation will be made about a wind power generator WG to which a sliding component related to the present disclosure is applicable and a yaw system YS provided for the wind power generator WG with reference to FIGS. 1A and 1B. A sliding component 10 related to the first embodiment can be used as a part of the yaw system YS.

Figure 1A:
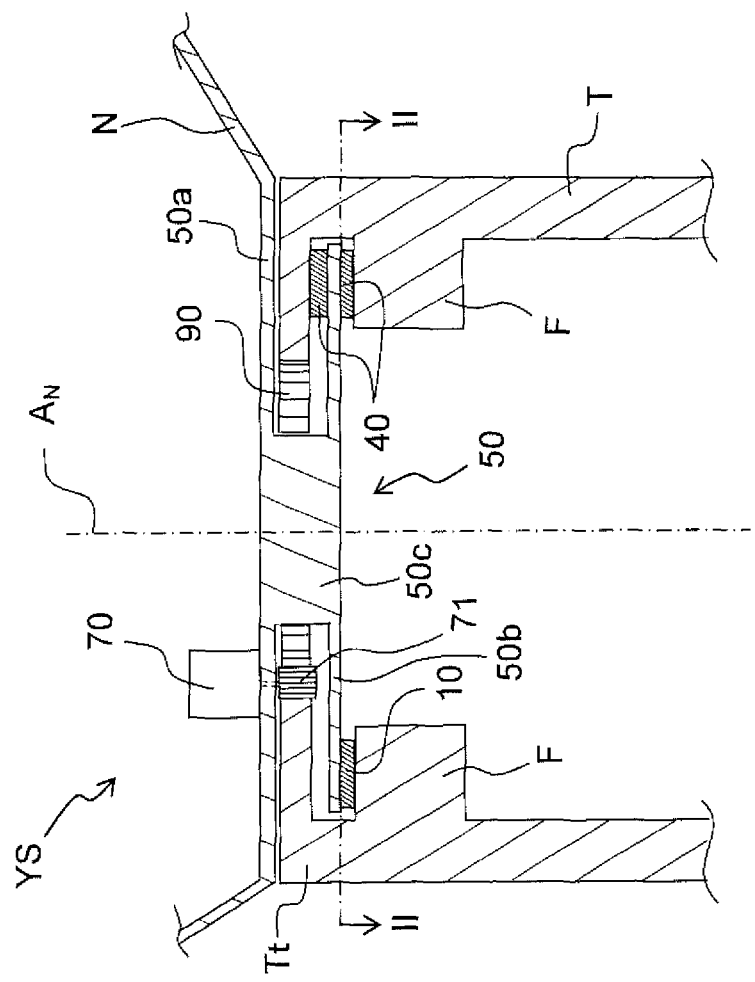
FIG. 1A schematically depicts a wind power generator related to the first embodiment of the present disclosure.

As depicted in FIG. 1A, the wind power generator WG mainly includes a hub H, three blades B mounted to the hub H, a nacelle N which supports the hub H such that the hub H can rotate around a horizontal axis, and a tower T which supports the nacelle N such that the nacelle N can rotate around a vertical axis. Rotating the hub H by the blades B receiving wind generates rotative force, and the rotative force is transmitted to an electric generator (not depicted in the drawings) disposed in the nacelle N via a speed-up gearbox (not depicted in the drawings) disposed in the nacelle N. The electricity generated by the electric generator is transmitted to the outside through cables (not depicted in the drawings) disposed in the tower T.

The wind power generator WG performs yaw control, in which the nacelle N is pivoted such that the hub H always faces in a windward direction, in order to receive surrounding wind without waste. The yaw control is performed by the yaw system YS disposed in the nacelle N and the tower T.

Figure 1B:
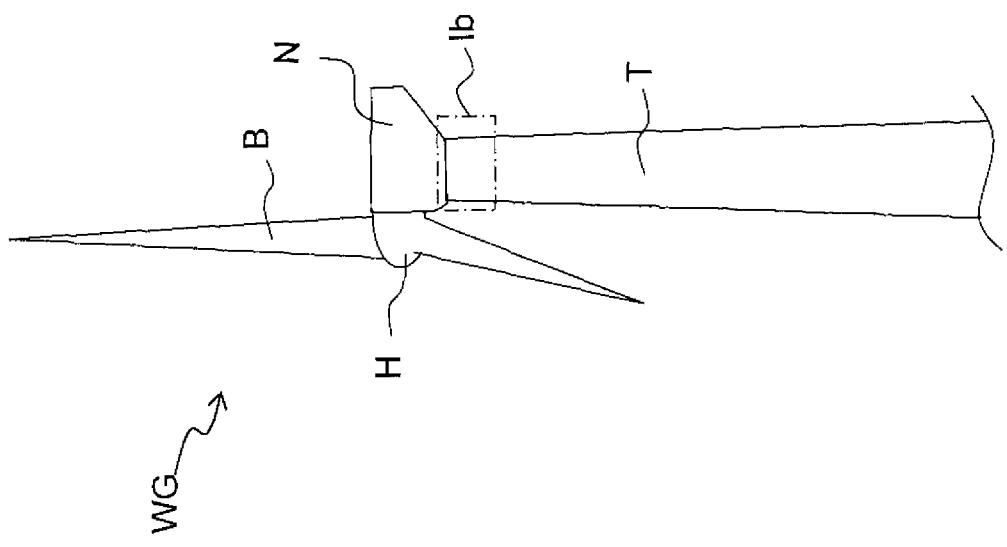
FIG. 1B is an enlarged sectional view of the area Ib of FIG. 1A surrounded by dashed-dotted lines, the view being obtained by cutting a yaw system, which includes a sliding component related to the first embodiment, along a surface including a rotational center axis of a nacelle.

As depicted in FIG. 1B, the yaw system YS mainly includes a turn table (rotating plate, rotating body) 50 mounted on the lower side of the nacelle N, sliding components 10 disposed on a flange F, which is provided in the vicinity of the top of the tower T, at predetermined intervals in a circumferential direction of the flange F, brake pads 40, an electric motor 70 fixed to the turn table 50, and a ring gear 90 formed in a top plate Tt of the tower T. The yaw system YS rotates the nacelle N around a rotational axis $A_N$.

Figure 2:
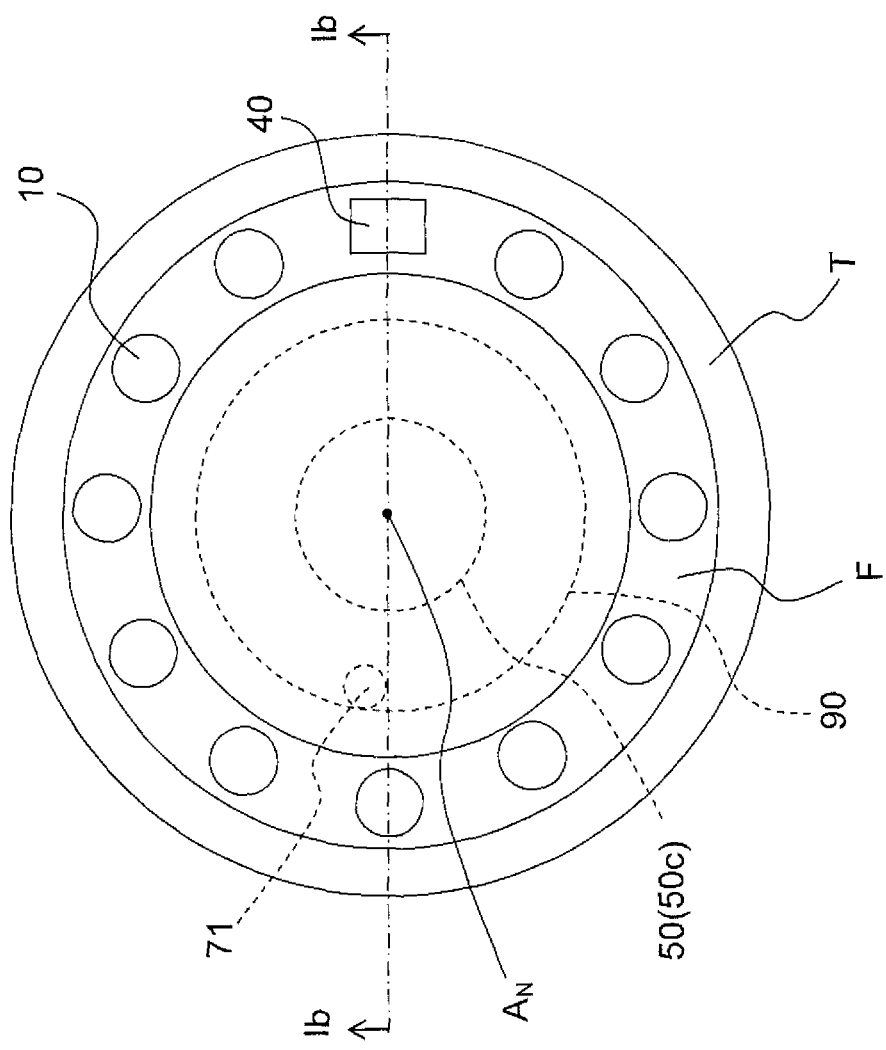
FIG. 2 depicts arrangement of components of the yaw system as viewed from above.

FIG. 2 depicts a positional relation of the turn table 50, the sliding components 10, the brake pad 40, and the ring gear 90 in the yaw system YS as viewed from the upper side. FIG. 2 is a cross-sectional view taken along the line II-II in FIG. 1B. In FIG. 2, the sliding components 10, the brake pad 40, the flange F, and the tower T those of which are disposed on the lower side of this cross-section are indicated by solid lines, a shaft part 50c as described later) of the turn table 50, the ring gear 90, and a pinion gear 71 as described later) attached to the electric motor 70 those of which are disposed on the upper side of this cross-section are indicated by dashed lines. Note that FIG. 1B is a cross-sectional view taken along the line Ib-Ib in FIG. 2.

The turn table 50 is an iron plate constituting a part of the nacelle N. The turn table 50 includes an upper part 50a which is a bottom surface of the nacelle N, a disk-shaped lower part 50b positioned on the lower side of the upper part 50a, and the shaft part 50c connecting the parts 50a and 50b. The upper part 50a, lower part 50b, and shaft part 50c are coaxially arranged. The turn table 50 rotates in a state that the lower surface of the lower part 50b is in contact with and supported by the sliding components 10 (see FIG. 2) disposed on the flange F. The shaft part 50c of the turn table 50 has a diameter smaller than those of the upper and lower parts 50a, 50b. The shaft part 50c is supported by a shaft (not depicted in the drawings) to rotate around the rotational axis $A_N$. Rotation of the turn table 50 rotates the nacelle N integrally with the turn table 50 around the rotational axis $A_N$.

The brake pads 40 sandwich the disk-shaped lower part 50b from upper and lower sides based on a command from a controller (not depicted in the drawings), thereby controlling the rotation of the turn table 50. As viewed in plan view, the brake pad 40 and sliding components 10 are arranged at regular intervals such that they are positioned rotationally symmetric in the circumferential direction with the rotational axis $A_N$ of the nacelle N as the center (FIG. 2).

The electric motor 70 is a motor which is controlled by the controller (not depicted in the drawings). The electric motor 70 rotates the pinion gear 71 engaging with the ring gear 90, thereby rotating the nacelle N relative to the tower T via the shaft part 50c of the turn table 50. The controller receives a measurement result, such as a wind direction, from a measuring unit (not depicted in the drawings) and controls driving of the electric motor 70 based on the measurement result.

Subsequently, the sliding component 10 related to the first embodiment will be explained in detail.

Figure 3B:
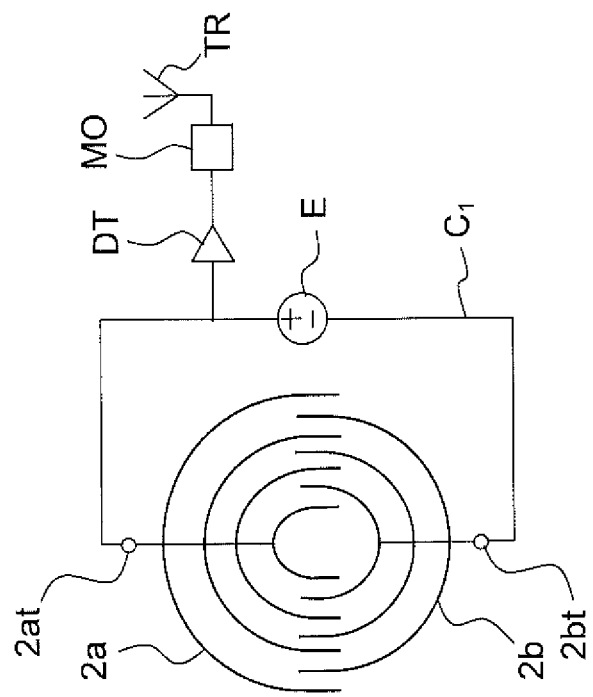
FIG. 3B is a circuit diagram including a conductive wire provided for the sliding component related to the first embodiment of the present disclosure.
Figure 3A:
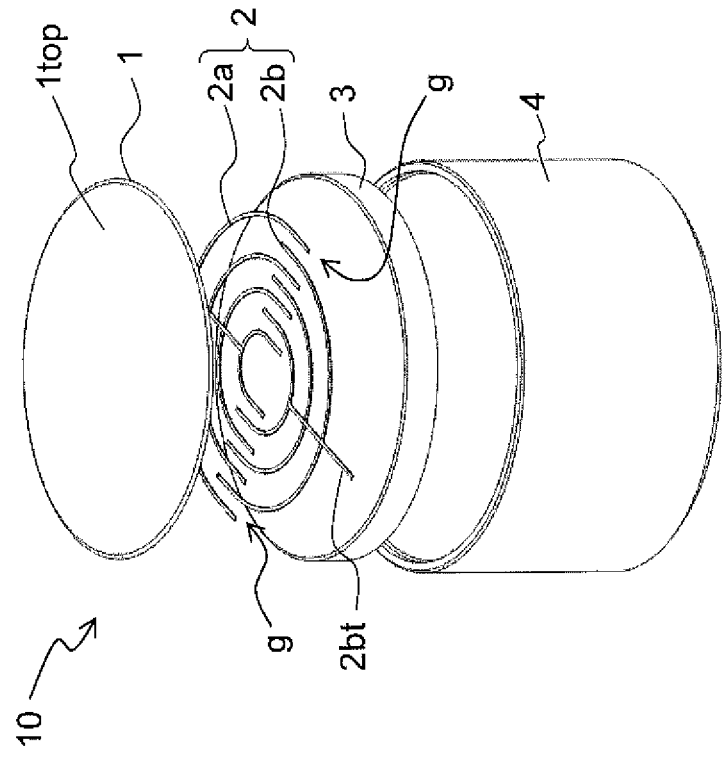
FIG. 3A is an exploded view of the sliding component related to the first embodiment of the present disclosure.

As depicted in FIG. 3A, the sliding component 10 related to the first embodiment has a cylindrical shape. The sliding component 10 mainly includes a liner (first sliding part) 1, a conductive wire (conductive member) 2, a reserve member (second sliding part) 3, and a base 4, and they are arranged from a sliding surface 1 top of the liner 1 to the base 4 in that order. In the following explanation, the side on which the liner 1 is disposed is defined as the upper side of the sliding component 10 and the side on which the base 4 is disposed is defined as the lower side of the sliding component 10. A direction perpendicular to the up-down direction is referred to as a horizontal direction.

The liner 1 is a disk-shaped part which slidably supports the turn table 50 in the yaw system YS by making contact directly with the turn table 50. The liner 1 having the substantially horizontal sliding surface 1 top is circular-shaped as viewed in planer view. The liner 1 is made of non-conductive material, in particular, it is preferred that the liner 1 be made of self-lubricating resin material. In the first embodiment, the liner 1 is made of polytetrafluoroethylene (PTFE) or self-lubricating resin containing PTFE. Materials, such as resin, usable for the liner 1 related to the present disclosure will be described later.

The conductive wire 2 is arranged in an approximately horizontal plane (that is, in the same plane) on the lower side of the liner 1, in order words, the conductive wire 2 is arranged substantially in parallel with the sliding surface 1 top of the liner 1. The conductive wire 2 is formed of a first conductive wire (first conductive part) 2a and a second conductive wire (second conductive part) 2b which are not electrically connected to each other. Each of the first conductive wire 2a and the second conductive wire 2b includes arc-like line parts having mutually different radii and a connecting line part connecting the arc-like line parts with each other. Namely, the first conductive wire 2a includes four approximately semicircular wires arranged concentrically and an end 2at (FIG. 3B) connecting the four wires at the center of the arc in a radial direction; and the second conductive wire 2b includes three approximately semicircular wires arranged concentrically and an end 2bt connecting the three wires at the center of the arc in a radial direction. As depicted in FIG. 3A, the first conductive wire 2a and the second conductive wire 2b are disposed between the liner 1 and the reserve member 3 while being separated from each other in the horizontal direction. Specifically, the first conductive wire 2a and the second conductive wire 2b are disposed such that six ends of three approximately semicircular wires of the second conductive wire 2b and eight ends of four approximately semicircular wires of the first conductive wire 2a overlap with each other in a certain radial direction and that the six ends and the eight ends are separate from each other in another radial direction perpendicular to the certain radial direction. This configuration defines gaps g aligned in the another radial direction between the first conductive wire 2a and the second conductive wire 2b.

The reserve member 3, which has a disk-shape like the liner 1, is disposed on the lower side of the conductive wire 2. After the liner 1 is abraded (worn away), the reserve member 3 makes contact with the turn table 50 substituting the liner 1 and slidably supports the turn table 50. Thus, it is preferred that the reserve member 3 itself has appropriate slidability. In the first embodiment, the reserve member 3 is made of polyetheretherketone (PEEK).

The base 4, which is made of steel material, is a disk-shaped member supporting the reserve member 3 from the lower side.

The sliding component 10 has a configuration in which the above components are brought into tight contact with each other in the up-down direction. More specifically, the liner 1 and the reserve member 3 hold the conductive wire 2 while making tight contact with the conductive wire 2 from upper and lower sides. The base 4 supports the reserve member 3, the conductive wire 2, and the liner 1 in this order while contacting tightly with the lower surface of the reserve member 3. In the yaw system YS, the base 4 of the sliding component 10 is disposed on a recessed part formed in the flange F of the tower T.

Subsequently, an explanation will be made about a method of using the sliding component 10 related to the first embodiment.

As depicted in FIG. 1B, the sliding component 10 related to the first embodiment is disposed on the upper surface of the flange F of the tower T to support the nacelle N via the turn table 50 with the liner 1 making contact with the turn table 50. When receiving the rotative force from the electric motor 70, the turn table 50 and the nacelle N slide on the liner 1 to rotate around the rotational axis $A_N$.

Further, in the state that the sliding component 10 is disposed on the flange F of the tower T, the first conductive wire 2a is connected to a positive electrode of a power source E disposed in the tower T via the end 2at, and the second conductive wire 2b is connected to a negative electrode of the power source E via the end 2bt, as depicted in FIG. 3B. This configuration forms a circuit $C_1$ in an open state which includes the first conductive wire 2a, the second conductive wire 2b, and the power source E. The first conductive wire 2a has electric potential higher than that of the second conductive wire 2b. The circuit $C_1$ is connected to a detector DT which detects whether or not current flows through the circuit $C_1$ so as to generate a digital signal based on the detection, a modem MO, and a transmitter TR those of which are disposed in the tower T.

As depicted in FIG. 3A, the first conductive wire 2a and the second conductive wire 2b are disposed with gaps g intervening therebetween. Thus, the first conductive wire 2a is not electrically connected to the second conductive wire 2b as long as the liner 1 is not yet worn away. However, when the wear of the liner 1 has become severe due to friction between the liner 1 and the turn table 50, the conductive turn table 50 made of metal makes contact with the first conductive wire 2a and the second conductive wire 2b. This contact electrically connects the first conductive wire 2a and the second conductive wire 2b, and thus current flows through the circuit $C_1$ in a closed state.

When the circuit $C_1$ becomes closed, the detecting circuit DT detects the closed state and generates the corresponding digital signal. The digital signal is converted into an analog signal by the modem MO and the analog signal is transmitted to the transmitter TR. The transmitter TR transmits the received analog signal.

When not only the liner 1 but also the conductive wire 2 has disappeared due to wear, the reserve member 3 makes contact directly with the turn table 50 and slidably supports the turn table 50. The reserve member 3 is made of PEEK as described above. Thus, the reserve member 3 has good slidability although the slidability thereof is inferior to that of the liner 1 made of PTFE or the self-lubricating resin containing PTFE. Accordingly, slidable support of the turn table 50 is maintained by the reserve member 3 even after the liner 1 is abraded.

Such a configuration enables the sliding component 10 having the abraded liner 1 to be replaced by a new sliding component 10 while the reserve component 3 is slidably supporting the turn table 50 after detection of abrasion of the liner 1. Thus, the yaw system YS is prevented from being damaged.

Effects of the sliding component 10 related to the first embodiment are summarized as follows.

In the sliding component 10 related to the first embodiment, the conductive wire 2 is disposed on the lower side of the liner 1, and abrasion of the liner 1 can be detected by the contact between the conductive wire 2 and the turn table 50. Thus, in the sliding component 10 related to the first embodiment, transmitting the detection result, for example, by wireless allows a worker to easily know abrasion of the liner 1 in the sliding component 10 disposed at a high location without dispatching any worker to the top of the tower T.

The sliding component 10 related to the first embodiment can detect abrasion of the liner 1 in real time by using the conductive wire 2. Thus, regular abrasion checks are unnecessary. The sliding component 10 related to the first embodiment detects abrasion of the liner 1 instantly, and thus the sliding component 10 related to the first embodiment can properly detect rapid progression of wear which may be caused by a phenomenon such as frequent wind gusts and which is not appropriately detected in periodic abrasion checks.

In the sliding component 10 related to the first embodiment, the gaps g aligned in a row are defined between the extremities of four wires of the first conductive wire 2a and the extremities of three wires of the second conductive wire 2b. When the turn table 50 electrically connects an end of the first conductive wire 2a and an end of the second conductive wire 2b defining any one of the gaps g, the first conductive wire 2a is electrically connected to the second conductive wire 2b and abrasion of the liner 1 is detected. Thus, in the sliding component 10 related to the first embodiment, even when abrasion of the liner 1 has occurred partially or locally, this abrasion can be detected satisfactorily.

As described above, the sliding component 10 related to the first embodiment can detect abrasion of the liner 1 easily, which allows a worker to know the timing for replacement of the sliding component 10 without labor. Thus, even if the sliding component 10 related to the first embodiment is used in the vicinity of a brake unit, which is more likely to damage the liner by scattering wear powder of a brake pad, it is possible to prevent the increase in operational costs which would be otherwise caused by frequent wear checks.

In the sliding component 10 related to the first embodiment, the reserve member 3 is disposed on the lower side of the conductive wire 2. Thus, the reserve member 3 slidably supports the turn table 50 reasonably well after the liner 1 has disappeared due to wear. This gives sufficient time after abrasion of the liner 1 is detected until the replacement of the sliding component 10 is actually performed.

A method for manufacturing the sliding component 10 related to the first embodiment is not particularly limited. The sliding component 10 related to the first embodiment can be manufactured, for example, by the following method. At first, the conductive wire 2 is disposed on the upper surface of the reserve member 3, and the conductive wire 2 and the reserve member 3 are coated with self-lubricating resin containing PTFE to form the liner 1. Next, the lower surface of the reserve member 3 is fixed to the top surface of the base 4 to support, by the base 4, the liner 1, conductive wire 2, and reserve member 3 formed integrally.

First Modified Example

Figure 4A:
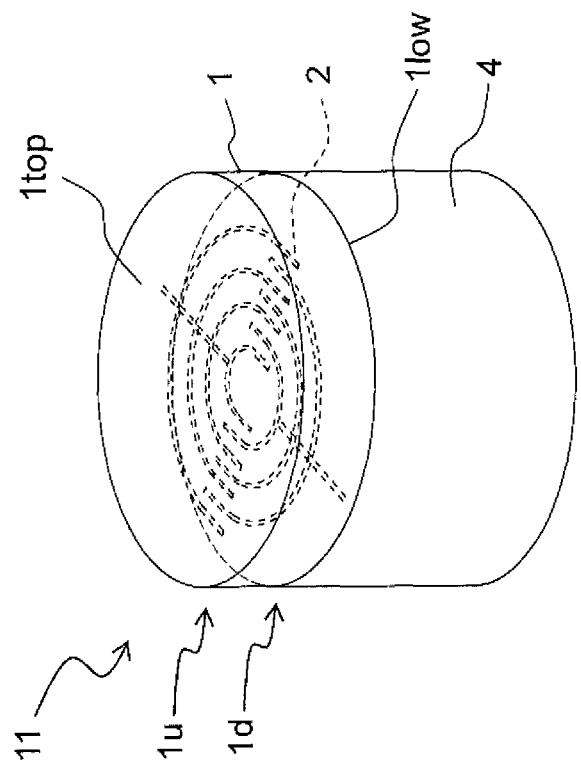
FIG. 4A is a perspective view of a sliding component related to a modified example of the first embodiment of the present disclosure.
Figure 4B:
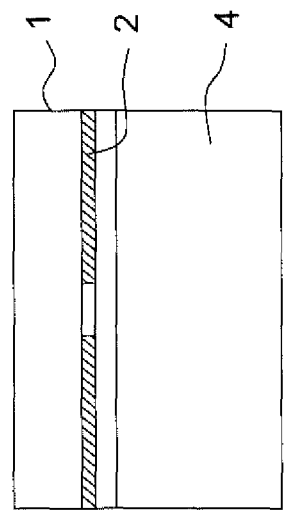
FIG. 4B is a cross-sectional view of the sliding component obtained by cutting the sliding component along a surface including an end $2bt$ and being perpendicular to an upper surface $1$ top.

Subsequently, an explanation will be made about a sliding component 11 related to the first modified example of the first embodiment with reference to FIGS. 4A and 4B. The sliding component 11 related to the first modified example differs from the sliding component 10 related to the first embodiment in that the conductive wire 2 is arranged within the liner 1 and that no reserve member 3 is provided, as depicted in FIGS. 4A and 4B. Other respects are the same as those of the sliding component 10 related to the first embodiment.

In the sliding component 11 related to the first modified example, the conductive wire 2 is disposed within the liner 1, on the lower side of the center of the liner 1 in the up-down direction (thickness direction), positioned in a plane substantially parallel to an upper surface 1 top of the liner 1. In the following, a part of the liner 1 positioned on the upper side of the inlying conductive wire 2 is referred to as an upper liner $1u$, and a part of the liner 1 positioned on the lower side of the inlying conductive wire 2 is referred to as a lower liner $1d$.

The method of using the sliding component 11 related to the first modified example is the same as that of the sliding component 10 related to the first embodiment.

The sliding component 11 related to the first modified example can obtain effects similar to those of the sliding component 10 related to the first embodiment. Further, in the sliding component 11 related to the first modified example, the conductive wire 2 is formed within the liner 1 and the lower liner $1d$ is disposed on the lower side of the conductive wire 2. Thus, when the upper liner $1u$ is abraded and progression of wear of the liner 1 is detected, the lower liner $1d$ slidably supports the turn table 50 satisfactorily. Accordingly, the sliding component 11 related to the first modified example can obtain the same effects as the sliding component 10 related to the first embodiment, and the turn table 50 can be slidably supported, even after detection of wear of the upper liner $1u$, with the same sliding performance as that before detection of wear of the upper liner $1u$.

In the manufacture of the sliding component 11 related to the first modified example, at first, the conductive wire 2 and the liner 1 are formed integrally through insert molding so that the conductive wire 2 is disposed within the liner 1. Next, the liner 1 in which the conductive wire 2 is disposed is supported by the base 4. Or, the following manner may be used instead of the insert molding. Namely, a part corresponding to the lower liner $1d$ of the liner 1 is formed first, the conductive wire 2 is arranged on the part, and then self-lubricating resin containing PTFE is coated on the conductive wire 2 and cured to form a part corresponding to the upper liner $1u$.

In the sliding component 11 related to the first modified example, the conductive wire 2 may be arranged at any position in the liner 1 in the up-down direction (thickness direction). When the conductive wire 2 is disposed closer to a lower surface $1low$ of the liner 1 in the up-down direction to increase the thickness of the upper liner $1u$, the elapsed time until progression of wear in the liner 1 is detected becomes longer. In this case, however, the operational time of the sliding component 11 after detection of wear of the upper liner $1u$ becomes shorter. When the conductive wire 2 is disposed closer to the upper surface $1top$ of the liner 1 in the up-down direction to increase the thickness of the lower liner $1d$, the elapsed time until detection of wear in the liner 1 becomes shorter. In this case, however, the operational time of the sliding component 11 after detection of wear in the upper liner $1u$ becomes longer. This provides enough time after wear detection in the liner 1 until replacement of the sliding component 11 is actually performed.

In the first embodiment and the first modified example, specific shapes and arrangements of the first conductive wire $2a$ and the second conductive wire $2b$ have been described. Those, however, are merely examples and any other configuration may be used provided that one of the wires $2a$, $2b$ has electric potential higher than that of the other of the wires $2a$, $2b$ and that current flows from one of the wires $2a$, $2b$ to the other of the wires $2a$, $2b$ due to contact between the turn table 50 and the wires $2a$, $2b$. Further, in the first embodiment and the first modified example, the first conductive wire $2a$ and the second conductive wire $2b$ have a linear shape. The first conductive wire $2a$ and the second conductive wire $2b$, however, may have a belt-like shape or may be a thin film (conductive film) covering a predetermined area of the reserve member 3. Each gap defined between the first conductive wire $2a$ and the second conductive wire $2b$ may have any spacing distance and any arrangement, and any number of gaps may be provided. Increasing the number of gaps g enable good detection of occurrence of abrasion, even when the abrasion of the liner 1 has occurred unevenly or locally. The wear due to sliding movement of the turn table 50 may locally occur in a radial direction of the lower part $50b$ of the turn table 50 due to, for example, the manufacturing tolerance of the turn table 50. Therefore, it is preferred that the first conductive wire $2a$ and the second conductive wire $2b$ be distributed to cover widely in the radial direction of the lower part $50b$ of the turn table 50.

Second Embodiment

An explanation will be made about a sliding component related to the second embodiment with reference to FIG. 5.

The sliding component 10 in the first embodiment is an example of an sliding component effectively used with the conductive turn table 50. In the second embodiment, it will be explained a sliding component 20 which is effectively used with a turn table 50 made of non-conductive material, such as plastic.

The sliding component 20 related to the second embodiment has the same structure as the sliding component 10 related to the first embodiment, except that a conductive wire $2c$ has a shape different from that of the conductive wire 2 of the sliding component 10 related to the first embodiment.

The conductive wire $2c$ of the sliding component 20 related to the second embodiment is a conductive wire (conductive body) extending so as to make arcs having mutually different radii on the same plane. More specifically, as depicted in FIG. 5, the conductive wire $2c$ is a single conductive wire which is disposed to follow four concentric circles one by one so as to passing almost all areas of the lower surface of the liner 1 and the upper surface of the reserve member 3. The conductive wire $2c$ has ends $2ct_1$, $2ct_2$.

Similar to the sliding component 10 related to the first embodiment, the sliding component 20 related to the second embodiment is disposed on the flange F of the tower T. The sliding component 20 supports the turn table 50 and the nacelle N in a state that the liner 1 is in contact with the turn table 50. When receiving the rotative force from the electric motor 70, the turn table 50 and the nacelle N slide on the liner 1 to rotate around the rotational axis $A_N$.

Figure 5B:
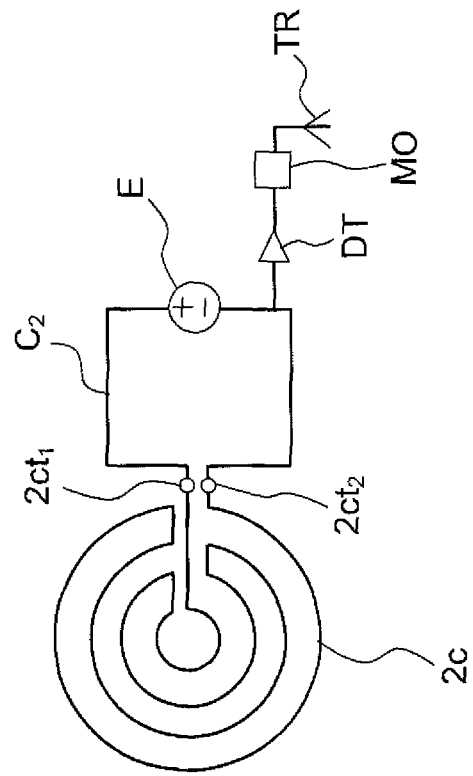
FIG. 5B is a circuit diagram including a conductive wire provided for the sliding component related to the second embodiment of the present disclosure.
Figure 5A:
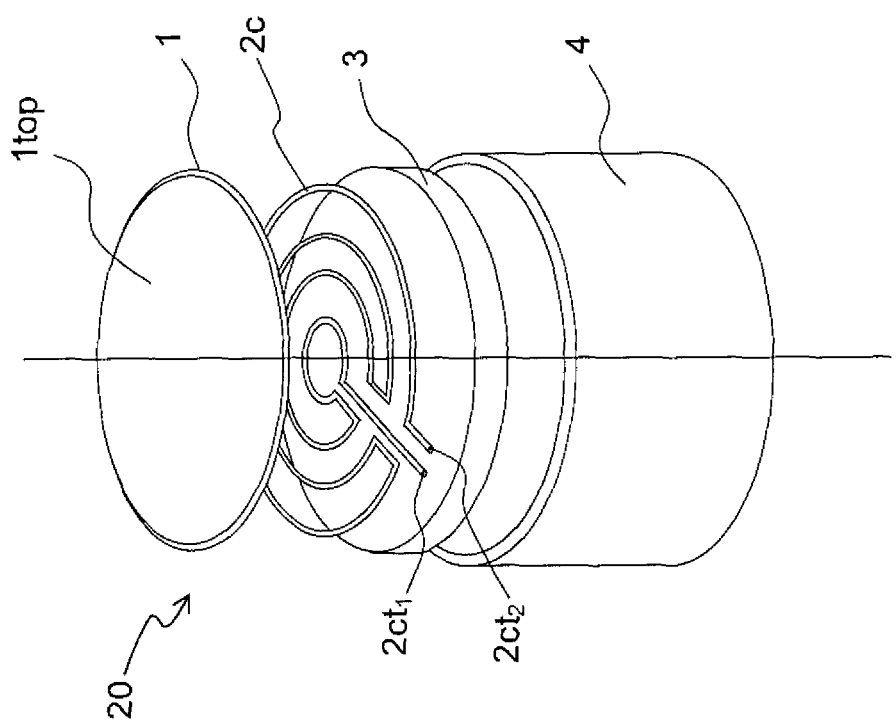
FIG. 5A is an exploded view of a sliding component related to the second embodiment of the present disclosure.

Further, in the state that the sliding component 20 is disposed on the flange F of the tower T, the end $2ct_1$ of the conductive wire $2c$ is connected to a positive electrode of the power source E disposed in the tower T, and the end $2ct_2$ of the conductive wire $2c$ is connected to a negative electrode of the power source E, as depicted in FIG. 5B. This configuration forms a circuit $C_2$ in a closed state which is formed of the conductive wire $2c$ and the power source E. Current flows through the circuit $C_2$. The circuit $C_2$ is connected to the detector DT which detects whether or not current flows through the circuit $C_2$ so as to generate a digital signal based on the detection, the modem MO, and the transmitter TR those of which are disposed in the tower T.

Current flows through the conductive wire $2c$ as long as the liner 1 is not yet worn away. However, when the wear of the liner 1 has become severe due to friction between the liner 1 and the turn table 50, the non-conductive turn table 50 slides on the conductive wire $2c$ while making contact therewith and breaks the conductive wire $2c$. This changes the state in the circuit $C_2$ from the closed state to the open state, thereby interrupting current.

When the state in the circuit $C_2$ has changed from the closed state to the open state, the detecting circuit DT detects this change and generates a corresponding digital signal. The modem MO converts the digital signal to an analog signal and transmit the analog signal to the transmitter TR. The transmitter TR transmits the received analog signal.

The sliding component 20 related to the second embodiment can provide the effects similar to those of the sliding component 10 related to the first embodiment. The sliding component 20 related to the second embodiment can be manufactured by the same method as the sliding component 10 related to the first embodiment.

Second Modified Example

Figure 6:
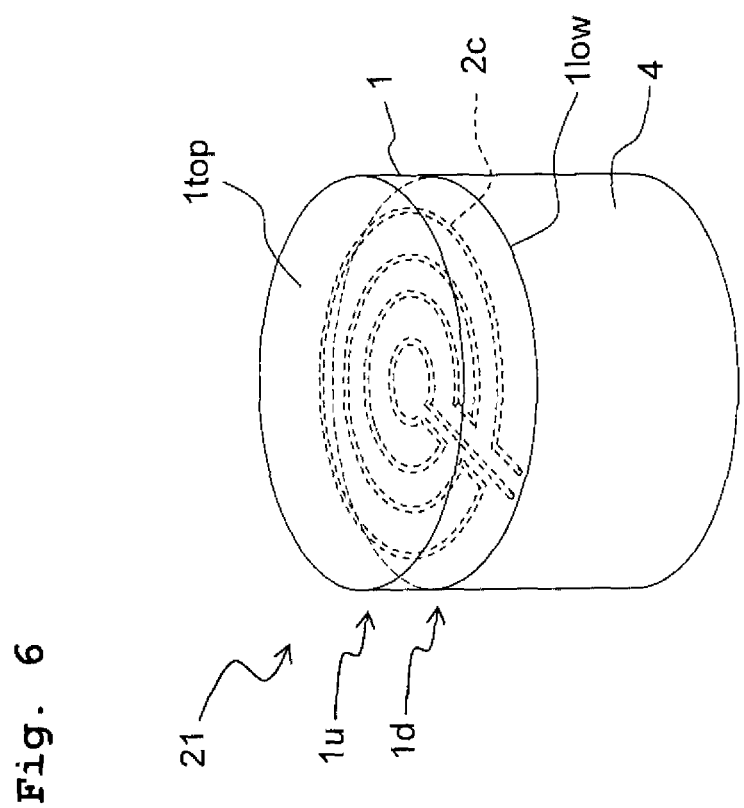
FIG. 6 is a perspective view of a sliding component related to a modified example of the second embodiment of the present disclosure.

Subsequently, an explanation will be made about a sliding component 21 related to the second modified example of the second embodiment with reference to FIG. 6. The sliding component 21 related to the second modified example differs from the sliding component 20 related to the second embodiment in that the conductive wire 2c is arranged within the liner 1 and that no reserve member 3 is provided, as depicted in FIG. 6. Other respects are the same as those of the sliding component 20 related to the second embodiment.

In the sliding component 21 related to the second modified example, the conductive wire 2c is disposed within the liner 1, on the lower side of the center of the liner 1 in the up-down direction (thickness direction). In the following, a part, of the liner 1, positioned on the upper side of the inlying conductive wire 2c is referred to as an upper liner 1u (first conductive part), and a part, of the liner 1, positioned on the lower side of the inlying conductive wire 2c is referred to as a lower liner 1d (second conductive part).

The method of using the sliding component 21 related to the second modified example is the same as that of the sliding component 20 related to the second embodiment.

The sliding component 21 related to the second modified example can obtain the effects similar to those of the sliding component 20 related to the second embodiment. Further, in the sliding component 21 related to the second modified example, the conductive wire 2c is formed within the liner 1 and the lower liner 1d is disposed on the lower side of the conductive wire 2c. Thus, when the upper liner 1u is abraded and progression of wear of the liner 1 is detected, the lower liner 1d slidably supports the turn table 50 satisfactorily. Accordingly, the sliding component 21 related to the second modified example can obtain the same effects as the sliding component 20 related to the second embodiment, and the turn table 50 can be slidably supported, even after detection of wear of the upper liner 1u, with the same sliding performance as that before detection of wear of the upper liner 1u.

The sliding component 21 related to the second modified example can be manufactured, for example, by the following method. The manufacturing method thereof, however, is not particularly limited thereto. At first, the conductive wire 2c is disposed in the liner 1 through insert molding. Next, the liner 1 in which the conductive wire 2c is disposed is supported by the base 4. Or, the following manner may be used instead of the insert molding. Namely, a part corresponding to the lower liner 1d of the liner 1 is formed first, the conductive wire 2c is arranged on the part, and then the conductive wire 2c is coated with PTFE to form a part corresponding to the upper liner 1u.

In the sliding component 21 related to the second modified example, the conductive wire 2c may be arranged at any position in the liner 1 in the up-down direction (thickness direction), like the sliding component 11 related to the first modified example.

In the second embodiment and the second modified example, the conductive wire 2c may have any shape and any arrangement. The conductive wire 2c may be arranged to pass large areas of the lower surface of the liner 1 and the upper surface of the reserve member 3. In this case, occurrence of abrasion of the liner 1 can be detected satisfactorily, even when the abrasion of the liner 1 has occurred unevenly or locally. The conductive wire 2c may be a thin film (conductive film) covering a predetermined area of the reserve member 3. The wear due to sliding movement of the turn table 50 may locally occur in a radial direction of the lower part 50b of the turn table 50 due to, for example, the manufacturing tolerance of the turn table 50. Therefore, it is preferred that the conductive wire 2c be distributed to cover widely in the radial direction of the lower part 50b of the turn table 50.

In the embodiments and the modified examples, the conductive wires 2, 2c are not limited to extend on the same plane, the conductive wires 2, 2c may bend upward or downward at intermediate parts thereof. For example, although the conductive wire 2c depicted in FIG. 5A extends on the same plane, it may extend as follows. Namely, the conductive wire 2c spirals or coils in a plane from the outside to the inside, bends upward or downward nearly at the center of the spiral, bends again to follow a plane parallel to the spiral surface, and reaches the outside of the spiral. Or, two or more of conductive wires 2, 2c may be formed in the up-down direction. For example, in the first and second embodiments, a second liner 1 and second conductive wires 2, 2c may be disposed on the lower side of the conductive wires 2, 2c and the reserve member 3 may be disposed on the lower side of the second conductive wires 2, 2c. In the first and second modified examples, first conductive wires 2, 2c and second conductive wires 2, 2c may formed in the liner 1 to overlap with each other in the up-down direction. The two or more of conductive wires 2, 2c overlapping with each other in the up-down direction may be configured to be identical to each other or different from each other. Arranging two or more of conductive wires 2, 2c overlapping with each other in the up-down direction enables gradual detection of wear of the liner 1. For example, the conductive wires 2, 2c positioned on the upper side may be used to detect that about 70% of the liner 1 has been abraded, and the conductive wires 2, 2c positioned on the lower side may be used to detect that more than 90% of the liner 1 has been abraded. When the conductive wires 2, 2c positioned on the lower side have detected the abrasion of the liner 1, a receiver receiving the detecting signal may raise an alarm visually or aurally.

Third Embodiment

An explanation will be made about a sliding component 30 related to the third embodiment with reference to FIG. 7.

The sliding components 10, 20 related to the first and second embodiments are used in the case that the turn table 50 is not electrically connected to the power source E disposed in the tower T. In the third embodiment, as depicted in FIG. 7, the sliding component 30 is effectively used in a case that the conductive turn table 50 is electrically connected to the power surface E disposed in the tower T.

Figure 7A:
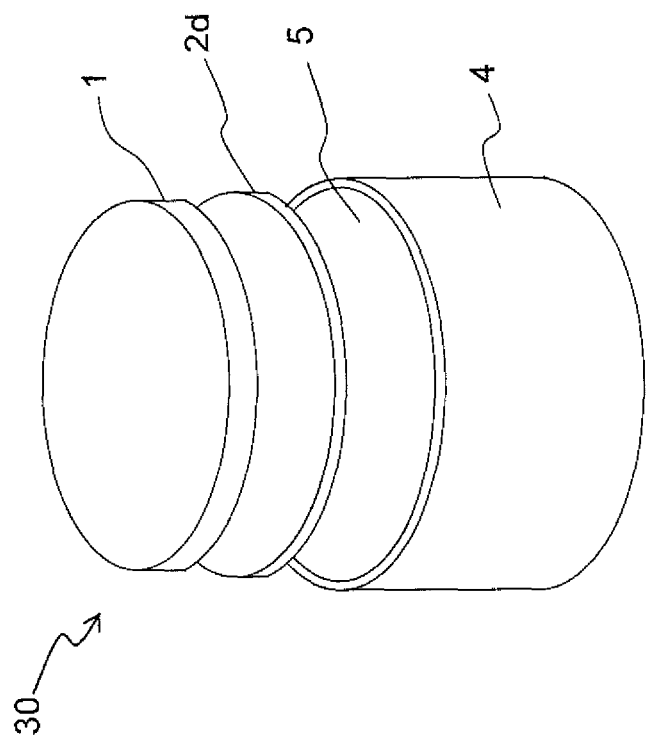
FIG. 7A is an exploded view of a sliding component related to the third embodiment of the present disclosure.

As depicted in FIG. 7A, the sliding component 30 related to the third embodiment is a cylindrical stacked structure. The sliding component 30 mainly includes a liner 1 (first sliding part), a conductive plate 2d (conductive member), an insulating film 5, and a base 4 and they are disposed in this order from the top of the sliding component 30.

Like the liner 1 related to the first and second embodiments, the liner 1 related to the third embodiment is a disk-shaped part which slidably supports the turn table 50 in the yaw system YS by making contact directly with the turn table 50. The liner 1 has a circular shape in plan view. It is preferred that the liner 1 be made of self-lubricating material, and in the above embodiments, the liner 1 is made of PTFE.

The conductive plate 2d is a copper-alloy flat plate having a circular shape. The conductive plate 2d is disposed in parallel with an upper surface 1 top of the liner 1 while being brought into contact under pressure with a lower surface of the liner 1. The base 4, which is made of steel material, is a disk-shaped member supporting the conductive plate 2d via the insulating film 5.

Subsequently, an explanation will be made about a method of using the sliding component 30 related to the third embodiment.

As depicted in FIG. 1B, the sliding component 30 related to the third embodiment is disposed on the upper surface of the flange F of the tower T. The sliding component 30 supports the nacelle N via the turn table 50 in a state that the liner 1 is in contact with the turn table 50. When receiving the rotative force from the electric motor 70, the turn table 50 and the nacelle N slide on the liner 1 to rotate around the rotational axis $A_N$.

Further, in the state that the sliding component 30 is disposed on the flange F of the tower T, the conductive plate 2d of the sliding component 30 is connected to a negative electrode of the power source E disposed in the tower T, as depicted in FIG. 73. This configuration forms a circuit $C_3$ in an open state which is formed of the turn table 50, the power source E, and the conductive plate 2d. The turn table 50 has electric potential higher than that of the conductive plate 2d. The circuit $C_3$ is connected to the detector DT which detects whether or not current flows through the circuit $C_3$ so as to generate a digital signal based on the detection, the modem MO, and the transmitter TR those of which are disposed in the tower T.

Figure 7B:
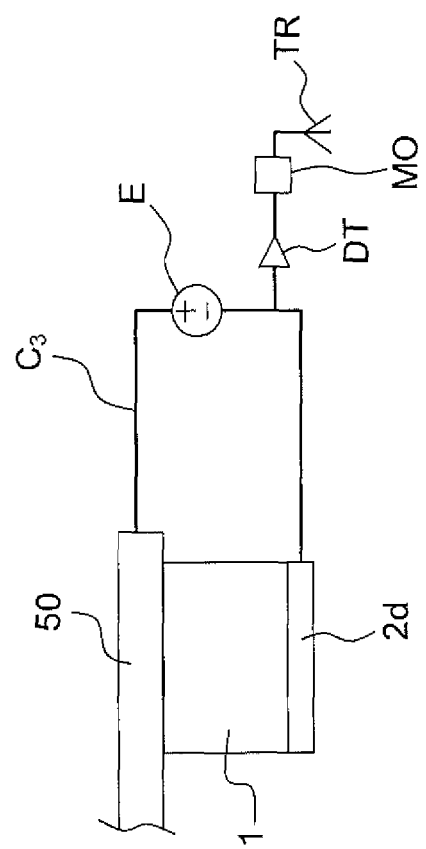
FIG. 7B is a circuit diagram including a conductive plate provided for the sliding component related to the third embodiment of the present disclosure.

As depicted in FIG. 7B, the liner 1 made of non-conductive PTFE is disposed between the turn table 50 and the conductive plate 2d. Thus, the state in which the turn table 50 has electric potential higher than that of the conductive plate 2d is maintained as long as the liner 1 is not yet worn away. When the wear of the liner 1 has become severe due to friction between the liner 1 and the turn table 50, the conductive turn table 50 made of iron makes contact with the conductive plate 2d, thereby electrically connecting the turn table 50 and the conductive plate 2d. This allows current to flow through the circuit $C_3$ in the closed state.

When the circuit $C_3$ becomes the closed state, the detecting circuit DT detects it and generates the digital signal. The digital signal is converted into an analog signal by the modem MO and the analog signal is transmitted to the transmitter TR. The transmitter TR transmits the received analog signal.

Effects of the sliding component 30 related to the third embodiment are summarized as follows.

In the sliding component 30 related to the third embodiment, the conductive plate 2d is disposed on the lower side of the liner 1, and the abrasion of the liner 1 can be detected by the contact between the conductive plate 2d and the turn table 50. Thus, in the sliding component 30 related to the third embodiment, transmitting the detection result, for example, by wireless allows to easily know abrasion of the liner 1 in the sliding component 30 disposed at a high place without dispatching any worker to the top of the tower T.

The sliding component 30 related to the third embodiment can detect in real time whether or not the liner 1 is abraded by using the conductive plate 2d. Thus, unlike regular abrasion checks currently performed, for example, once every three or four months, the abrasion of the liner 1 can be known as soon as it has occurred. Thus, the sliding component 30 related to the third embodiment can properly detect a rapid progression of wear (for example, due to a phenomenon such as frequent wind gusts) which would not be appropriately detected in periodic abrasion checks.

In the sliding component 30 related to the third embodiment, the conductive plate 2d is disposed across the entire lower surface of the liner 1. Thus, even when the liner 1 is locally and unevenly abraded, the sliding component 30 related to the third embodiment can satisfactorily detect the uneven abrasion by the contact between the turn table 50 and the conductive plate 2d disposed on the lower side of a part with uneven abrasion.

As described above, the sliding component 30 related to the third embodiment can detect abrasion of the liner 1 easily, thereby allowing a worker to know the timing for replacement of the sliding component 30 without an extra labor. Thus, it is possible to prevent the increase in operational costs which would be otherwise caused by frequent wear checks even if the sliding component 30 related to the third embodiment is used in the vicinity of a brake unit, which is more likely to damage the liner by scattering wear powder of a brake pad.

A method for manufacturing the sliding component 30 related to the third embodiment is not particularly limited. As an example, the sliding component 30 related to the third embodiment can be manufactured by the following method. At first, the upper surface of the conductive plate 2d is coated with PTFE to form the liner 1. Then, the lower surface of the conductive plate 2d is fixed to the top surface of the base 4 via the insulating film 5.

In the third embodiment, the power source E may be disposed in the nacelle N rather than disposed in the tower T. The turn table 50 may be connected to the negative electrode of the power source E rather than connected to the positive electrode, and the conductive plate 2d may be connected to the positive electrode of the power source E rather than connected to the negative electrode. When the power source E is arranged in the tower T, the electrical connection between the power source E and the turn table 50 can be realized, for example, by using a brush.

In the third embodiment, the conductive plate 2d may be a copper thin film. In the third embodiment, a second liner 1 and/or the reserve member 3 may be disposed on the lower side of the conductive plate 2d. In the third embodiment, the conductive plate 2d may be made of any other conductive material than copper alloy.

In the embodiments and the modified examples, the liner 1 is made of PTFE or self-lubricating resin containing PTFE. The present invention, however, is not limited thereto. Self-lubricating material obtained by mixing a resin and a solid lubricant can be used as the material of the liner 1. Examples of usable resin include epoxy resin, acrylic resin, phenol resin, and polyether ketone resin. Examples of usable solid lubricant include PTFE and molybdenum disulfide. The self-lubricating material obtained by mixing the resin and the solid lubricant may further contain carbon fiber, glass fiber, and the like. The self-lubricating resin containing PTFE may be exemplified by an ultraviolet curable resin composition, which contains PTFE as the solid lubricant and an acrylate compound having an isocyanuric acid ring that is any of di-(2-acryloxyethyl) isocyanurate and ε-caprolactone-modified tris-(2-acryloxyethyl) isocyanurate or a mixture of di-(2-acryloxyethyl) isocyanurate and tris-(2-acryloxyethyl) isocyanurate. The liner 1 is formed by subjecting the ultraviolet curable resin composition to ultraviolet curing. In this case, it is preferred that the ultraviolet curable resin composition contain 20 to 90% by weight of the acrylate compound having the isocyanuric acid ring and 10 to 50% by weight of PTFE. The ultraviolet curable resin composition may further contain at least one of bisphenol A epoxy acrylate, hydroxyethyl (meth)acrylate, isobornyl (meth)acrylate, pentaerythritol triacrylate and dipentaerythritol hexa(meth)acrylate, melamine cyanurate, and ethylene glycol di(meth)acrylate.

Further, the material of the liner 1 may be a fabric, which is made of PTFE and polyaramid fiber and is saturated with a phenol resin composition. Such fabric is disclosed, for example, in Japanese Patent Application Laid-open No. 2007-255712. Further, the material of the liner 1 may be a thermosetting acrylic composition containing 20% by weight or more of dipentaerythritol pentaacylate and 10% by weight or more of solid lubricant such as PIPE. Such a thermosetting acrylic composition is disclosed, for example, in U.S. Pat. No. 6,180,574. Further, the material of the liner 1 may be a self-lubricating resin composition obtained by mixing 60 to 80% by weight of polyether ketone resin, 10 to 30% by weight of PTFE, 5 to 15% by weight of carbon fiber, and 15% by weight or less of aramid fiber. Such a self-lubricating resin composition is disclosed, for example, in Japanese Patent Application Laid-open No. 2011-247408.

Further, the material of the liner 1 may be a Teflon (trade name) liner in which Teflon fiber, glass fiber, and other synthetic fiber are blended and the blended fiber is impregnated with phenolic resin. Further, the material of the liner 1 may be diamond-like carbon (DLC).

In the above embodiments, the liner 1, the conductive wire 2, and the reserve member 3 are joined directly to each other. An insulating layer, however, may be provided between the liner 1 and the conductive wire 2 or between the conductive wire 2 and the reserve member 3. When the insulating layer is provided between the liner 1 and the conductive wire 2, a conductive liner may be used as the liner 1. For example, it is possible to use a metal liner formed of an interlayer and a Teflon-lead surface layer, the interlayer being obtained such that bronze powder is sintered, on a relatively-soft steel back metal, to have a porous state and the porous structure is filled with a mixture of Teflon and lead.

In the embodiments and the modified examples, the liner 1 may be a multi-layer liner made of a plurality of different materials.

In the first and second embodiments, the reserve member 3 is made of polyetheretherketone. The present invention, however, is not limited thereto. The reserve member 3 may be made of engineering plastic, such as polyacetal (PPM), polyamide (PA), polycarbonate (PC), and polyethylene terephthalate (PET), instead of using polyetheretherketone (PEEK), or the reserve member 3 may be made of copper alloy. Alternatively, the reserve member 3 may be made of any of the self-lubricating materials described as the material of the liner 1.

When the reserve member 3 of the sliding component 10 related to the first embodiment is made of conductive material such as copper alloy, an insulating film is provided between the conductive wire 2 and the reserve member 3. The insulating film prevents electrical connection between the first conductive wire 2a and the second conductive wire 2b which would be otherwise caused by the conductivity of the reserve member 3 made of copper alloy.

As described above, the liner 1 may be made of the same material as the reserve member 3 or a material different from that of the reserve member 3. However, when considering that the liner 1 is a part which slidably supports the turn table 50 all the time and the reserve member 3 is a part which slidably supports the turn table 50 only for the period after the liner 1 has disappeared due to abrasion thereof before the sliding components 10, 20 are actually replaced, it is preferred that the material of the reserve member 3 be a material having hardness higher than that of material of the liner 1 and a wear property superior to that of material of the liner 1. On the other hand, the material of the reserve member 3 may have sliding performance inferior to that of material of the liner 1. Manufacturing costs of the sliding components 10, 20 can be reduced, accordingly. The sliding performance can be measured by a dynamic friction coefficient, and a material having a larger dynamic friction coefficient has higher sliding performance.

In the manufacturing method related to the first and second embodiments, the conductive wires 2, 2c are disposed on the upper surface of the reserve member 3 first, and then the conductive wires 2, 2c and the reserve member 3 are coated with resin such as PTFE to form the liner 1. The present invention, however, is not limited thereto. The liner 1 may be manufactured by a method suitable for the material to be used for the liner 1. For example, when it is preferable to use the liner 1 formed into a plate shape in advance, the liner 1 in the plate shape may be bonded to the conductive wires 2, 2c or the reserve member 3. When it is preferred that the liner is formed by vapor deposition, the liner 1 may be formed on the conductive wires 2, 2c or the reserve member 3 by vapor deposition.

Fourth Embodiment

An explanation will be made about a wear detection system related to the fourth embodiment with reference to FIG. 8.

Figure 8:
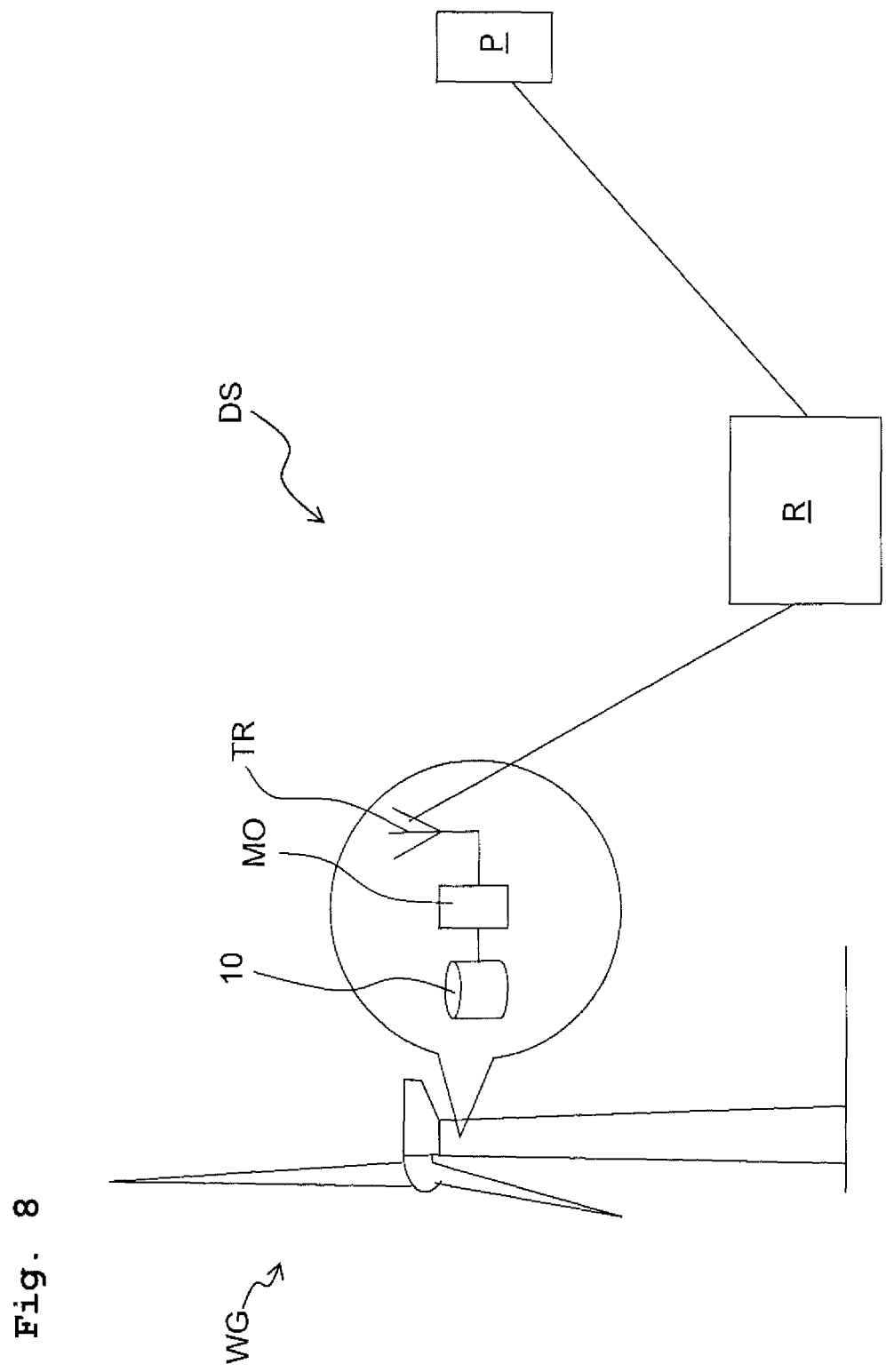
FIG. 8 schematically depicts a wear detection system related to the fourth embodiment of the present disclosure.

As depicted in FIG. 8, a wear detection system DS related to the fourth embodiment mainly includes the sliding component 10 disposed in the wind power generator WG, the modem MO and the transmitter TR connected to the sliding component 10, a repeater R, and a receiver P.

When abrasion has occurred in the sliding component 10, a digital signal indicating the occurrence of abrasion is transmitted to the modem MO. The modem MO converts the digital signal to an analog signal and transmits the analog signal to the transmitter TR. The analog signal send from the transmitter TR is transmitted to the receiver P via the repeater P. The analog signal received by the receiver P allows a user in a remote location to know that abrasion has occurred in the sliding component 10 in the wind power generator WG.

Any of the sliding components 11, 20, 21, and 30 may be used instead of the sliding component 10. The transmission of the signal from the transmitter TR to the receiver P may be made via a wired cable.

In the sliding components 10, 20 related to the first and second embodiments, the liner 1 and the reserve member 3 each have a circular shape in planar view. In the sliding component 30 related to the third embodiment and the sliding components 11, 21 related to the first and second modified examples, the liner 1 has a circular shape in planar view. The present invention, however, is not limited to those. The liner 1 and the reserve member 3 may each have an approximately C-shape in plan view. Each of the sliding components 10, 11, 20, 21, and 30 provided with the approximately C-shaped liner is singly disposed on the flange F (see FIG. 2) of the tower T, unlike the sliding components 10, 11, 20, 21, and 30 provided with the circular-shaped liner 1. In particular, the sliding component provided with the approximately C-shaped liner continuously extends in a circumferential direction centering on the axis $A_N$, with the brake pads 40 disposed in an opening of the C-shape. In the sliding components 10, 11 provided with the approximately C-shaped liner, the conductive wire 2 depicted in FIGS. 3A and 3E may be provided as a plurality of conductive wires 2 in the circumferential direction. Or, the conductive wire 2 in the sliding components 10, 11 provided with the approximately C-shaped liner may have any other form. Similarly, in the sliding components 20, 21 provided with the approximately C-shaped liner, the conductive wire 2c depicted in FIGS. 5A and 5B may be provided as a plurality of conductive wires 2c in the circumferential direction. Or, the conductive wire 2c in the sliding components 20, 21 provided with the approximately C-shaped liner may have any other form. In the sliding component 30 provided with the approximately C-shaped liner, the conductive plate 2d may have the same shape in planer view as the liner 1 and may extend across the entire lower surface of the liner. In the embodiments, the brake pads 40 are used as brakes (means) regulating rotation of the turn table 50. The present invention, however, is not limited thereto. It is possible to use any brake provided that the brake includes a mechanism or structure, which regulates rotation of the turn table 50 by making contact with or having no contact with the turn table 50 or a component connected to the turn table 50.

In the embodiments and the modified examples, the sliding components 10, 11, 20, 21, and 30 are used in the wind power generator WG. The present invention, however, is not limited thereto. Further, in the embodiments and the modified examples, the turn table 50 in the wind power generator WG is an exemplary object related to the present invention. The object related to the present invention is not limited to the turn table 50. The sliding components 10, 11, 20, 21, and 30 related to the embodiments and the modified examples may be used for any object, and may be used for any purpose of sliding the object. For example, the sliding components 10, 11, 20, 21, and 30 may be suitably used for the purpose of slidably supporting a heavy object in a place, such as on the sea, in a mountain, and in the ground, which is difficult to be accessed by a worker. Further, the sliding components 10, 11, 20, 21, and 30 may be suitably used in a place which is easy to be accessed by a worker, and may be used for the purpose of slidably supporting a light object. As specific examples, the sliding components 10, 11, 20, 21, and 30 may be used in a positioning apparatus of a parabolic antenna, an movable portion of a mega solar panel, a guide pad of a flap strut track of an airplane, and the like.

The sliding component related to an embodiment includes the conductive member in the first sliding part or on the side opposite to the sliding surface of the first sliding part the side opposite to the side at which the first sliding part makes contact with an object). Thus, whether or not the first sliding part is worn can be detected by detecting the conduction state in the conductive member.

The sliding component related to an embodiment may further include a second sliding part on the side opposite to the sliding surface of the first sliding part. The conductive member may be positioned between the first sliding part and the second sliding part. The second sliding part slidably supports the object even after abrasion (worn away) of the first sliding part.

In the sliding component related to an embodiment, the second sliding part may be made of a material identical to a material of the first sliding part. In this case, the second sliding part slidably supports the object, even after detection of abrasion of the first sliding part, with the same sliding performance as that before detection of abrasion of the first sliding part.

In the sliding component related to an embodiment, the first sliding part may be made of self-lubricating resin. Using the self-lubricating resin slidably supports the object more satisfactorily while having insulation performance. It is preferred that the self-lubricating resin contain polytetrafluoroethylene.

In the sliding component related to an embodiment, the conductive member may extend in a plane and the sliding surface of the first sliding part may be substantially parallel to the plane in which the conductive member extends. In this configuration, the distance between the sliding surface of the first sliding part and the conductive member is constant. Thus, even if uneven wear has occurred in the sliding surface, the uneven wear is detected at the same timing regardless of the position of uneven wear.

The sliding component related to an embodiment may further include a base being provided on a side opposite to the sliding surface of the first sliding part and holding the first sliding part and the conductive member. This configuration enables easy setting and replacement of the sliding component by handling the base.

In the sliding component related to an embodiment, the conductive member may include a first conductive part and a second conductive part which are positioned on a same plane and are not electrically connected to each other. In this case, each of the first conductive part and the second conductive part may include a plurality of arc-like line parts having mutually different radii and a connecting line part connecting the plurality of arc-like line parts with each other.

In the sliding component related to an embodiment, the conductive member may be a single continuous conductive wire. In this case, the conductive wire may extend so as to make arcs having mutually different radii.

In the sliding component related to an embodiment, the conductive member may be a flat plate or a film.

According to an embodiment, there is provided a yaw system configured to adjust a direction of a nacelle of a wind power generator, the yaw system including:

a rotating body mounted to the nacelle; and the sliding component according to another embodiment which is configured to slidably support the rotating body; and a brake configured to restrain the rotating body.

The yaw system related to the embodiment can easily detect abrasion of the first sliding part of the sliding component by detecting the conduction state in the conductive member. Thus, it is possible to prevent the increase in operational costs which would be otherwise caused by frequent wear checks.

According to an embodiment, there is provided a wear detection system configured to detect wear of a sliding component caused by friction between the sliding component and a conductive object, the system including:

the sliding component according to another embodiment in which the conductive member includes the first conductive part and the second conductive part which are positioned on the same plane and are not electrically connected to each other; and a detector electrically connected to the first conductive part and the second conductive part of the sliding component and configured to detect an electrical connection between the first conductive part and the second conductive part.

According to an embodiment, there is provided a wear detection system configured to detect wear of a sliding component caused by friction between the sliding component and a non-conductive object, the system including:

the sliding component according to another embodiment in which the conductive member is the single continuous conductive wire; and a detector electrically connected to the conductive wire of the sliding component and configured to detect a cutoff of the conductive wire.

In the wear detection systems according to those embodiments, the detector connected to the conductive member can detect the change in the conduction state of conductive member of the sliding component which is caused by wear of the first sliding part of the sliding component. Thus, it is possible to easily detect occurrence of abrasion of the first sliding part. The wear detection system according to one embodiment is suitable for detecting wear of the sliding component which is caused by the conductive object. The wear detection system according to the other embodiment is suitable for detecting wear of the sliding component which is caused by the non-conductive object.

According to an embodiment, there is provided a wear detection system configured to detect wear of a sliding component caused by friction between the sliding component and a conductive object, the system including:

the sliding component according to another embodiment in which the conductive member is the flat plate or the film; and a detector electrically connected to the conductive member of the sliding component and the conductive object and configured to detect an electrical connection between the conductive member and the conductive object.

In the wear detection system according to the embodiment, wear of the first sliding part, which is caused by sliding the conductive object on the sliding component, is detected by use of the detector detecting the electrical connection between the conductive object and the conductive member The wear detection systems according to an embodiment may further include a transmitter connected to the detector and a receiver configured to receive a signal transmitted from the transmitter. This configuration allows wear of the first sliding part to be easily detected in a remote location.

The yaw system according to an embodiment may include any of the wear detection systems according to the third to fifth aspects. Further, the present invention can provide a wind power generator provided with the yaw system according to the second aspect.

According to an embodiment, there is provided the sliding component which can easily recognize a wear state of the sliding member. Further, there is provided the yaw system, wear detection system, and wind power generator which can easily recognize a wear state of the sliding member.

The present disclosure is not limited to the embodiments and the modified examples, provided that characteristics of the present disclosure can be obtained. The present disclosure includes any other embodiments which can be conceived in the range of technical ideas of the present disclosure.

What is claimed is:

1. A sliding component comprising:
   a first sliding part which is non-conductive and which has a sliding surface;
   a second sliding part on the side opposite to the sliding surface of the first sliding part; and
   a conductive member positioned between the first sliding part and the second sliding part;
   wherein a material of the second sliding part is different from a material of the first sliding part, the material of the second sliding part having a hardness higher than a hardness of the material of the first sliding part.

2. The sliding component according to claim 1, wherein the first sliding part is made of self-lubricating resin.

3. The sliding component according to claim 2, wherein the self-lubricating resin contains polytetrafluoroethylene.

4. The sliding component according to claim 1, wherein the conductive member extends in a plane and the sliding surface of the first sliding part is substantially parallel to the plane in which the conductive member extends.

5. The sliding component according to claim 1, further comprising a base being provided on a side opposite to the sliding surface of the first sliding part and supporting the first sliding part and the conductive member.

6. The sliding component according to claim 1, wherein the conductive member includes a first conductive part and a second conductive part which are positioned on a same plane and are not electrically connected to each other.

7. The sliding component according to claim 6, wherein each of the first conductive part and the second conductive part includes a plurality of arc-like line parts having mutually different radii and a connecting line part connecting the plurality of arc-like line parts with each other.

8. The sliding component according to claim 1, wherein the conductive member is a single continuous conductive wire.

9. The sliding component according to claim 8, wherein the conductive wire extends so as to make arcs having mutually different radii.

10. The sliding component according to claim 1, wherein the conductive member is a flat plate or a film.

11. A wear detection system configured to detect wear of a sliding component caused by friction between the sliding component and a conductive object, the system comprising: the sliding component as defined in claim 6; and a detector electrically connected to the first conductive part and the second conductive part of the sliding component and configured to detect an electrical connection between the first conductive part and the second conductive part.

12. A wear detection system configured to detect wear of a sliding component caused by friction between the sliding component and a non-conductive object, the system comprising: the sliding component as defined in claim 8; and a detector electrically connected to the conductive wire of the sliding component and configured to detect a cutoff of the conductive wire.

13. A wear detection system configured to detect wear of a sliding component caused by friction between the sliding component and a conductive object, the system comprising: the sliding component as defined in claim 10; and a detector electrically connected to the conductive member of the sliding component and the conductive object and configured to detect an electrical communication between the conductive member and the conductive object.

14. The wear detection system according to claim 11, further comprising: a transmitter connected to the detector; and a receiver configured to receive a signal transmitted from the transmitter.

15. The wear detection system according to claim 12, further comprising: a transmitter connected to the detector; and a receiver configured to receive a signal transmitted from the transmitter.

16. The wear detection system according to claim 13, further comprising: a transmitter connected to the detector; and a receiver configured to receive a signal transmitted from the transmitter.

17. A yaw system configured to adjust a direction of a nacelle of a wind power generator, the yaw system comprising: a rotating body mounted to the nacelle; and the sliding component as defined in claim 1 which is configured to slidably support the rotating body; and a brake configured to restrain the rotating body.

18. A yaw system configured to adjust a direction of a nacelle of a wind power generator, the yaw system comprising: a rotating body mounted to the nacelle; and the wear detection system as defined in claim 11.

19. A yaw system configured to adjust a direction of a nacelle of a wind power generator, the yaw system comprising: a rotating body mounted to the nacelle; and the wear detection system as defined in claim 12.

20. A yaw system configured to adjust a direction of a nacelle of a wind power generator, the yaw system comprising: a rotating body mounted to the nacelle; and the wear detection system as defined in claim 13.

21. The wind power generator comprising the yaw system as defined in claim 17.

* * * * *